United States Patent [19]
Groscurth

[11] Patent Number: 5,841,508
[45] Date of Patent: Nov. 24, 1998

[54] SPRING HINGE ASSEMBLY HAVING A TENSION BAR FOR ENERGIZING THE SPRING

[75] Inventor: Wilhelm Groscurth, Passau, Germany

[73] Assignee: Owp Brillen GmbH

[21] Appl. No.: 735,143

[22] Filed: Oct. 22, 1996

[51] Int. Cl.$^6$ ............................... G02C 5/16; G02C 5/22
[52] U.S. Cl. ............................ 351/113; 351/153; 16/228
[58] Field of Search .................................. 351/113, 111, 351/153, 41; 16/228

[56] References Cited

U.S. PATENT DOCUMENTS

| | | | |
|---|---|---|---|
| 3,654,376 | 4/1972 | Lyons, Sr. | 351/113 |
| 3,923,384 | 12/1975 | Leblanc . | |
| 4,747,183 | 5/1988 | Drlik | 351/113 |

FOREIGN PATENT DOCUMENTS

| | | |
|---|---|---|
| 203754 | 6/1959 | Austria . |
| 85744 | 8/1895 | Germany . |
| 128770 | 6/1991 | Germany . |

*Primary Examiner*—Hung X. Dang
*Attorney, Agent, or Firm*—Cushman, Darby & Cushman Ip Group of Pillsbury, Madison & Sutro LLP

[57] ABSTRACT

A spring hinge assembly, especially for a temple of a pair of glasses, provides high wearing comfort in glasses, and includes a tension bar, a spring, a joint, and first and second abutments. The tension bar engages the first abutment which in turn engages the spring, and with its tension bar head cooperates in such a manner with the second abutment fixed to the joint so that beyond a predetermined opening angle of the spring hinge, the tension bar moves the first abutment toward the joint under spring tension. Preferably, the movable first abutment and the spring are threaded onto the temple.

9 Claims, 3 Drawing Sheets

SPRING HINGE ASSEMBLY HAVING A TENSION BAR FOR ENERGIZING THE SPRING

BACKGROUND OF THE INVENTION

1. Field of the Invention

The invention relates to a spring hinge, especially for a temple of a pair of glasses which allows the glasses to rest resiliently on the head of the head of the wearer. Such a spring hinge increases the wearing comfort of the glasses frame and secures the temple joint against excessive strain.

2. Description of the Prior Art

A spring hinge suitable for this purpose and presently available on the market is shown in FIG. 4, where the spring hinge is mounted in the temple S21. The spring hinge has a compression spring S1, a support ring S3 which acts upon the compression spring S1 in the manner of an abutment, and a closure sheath S5, against which the compression spring is pressed. The closure sheath S5 is also provided with a circumferentially extending groove S15. The closure sheath S5, the compression spring S1 and the support ring S3 are fitted onto a rod S7 of a temple portion S11 that has the temple joint S9 and are secured on the rod S7 with a screw S13. The thus-mounted temple part S11 can then be introduced, for instance, into an axially extending recess S17, and the temple S21 is made to engage the groove S15 of the closure sheath S5, for instance, by pressing in the wall of the recess S17. In order to build up the spring action by the compression spring, the outer end face S19 of the temple S21 or the end face of the recess S17 is used as a stop. If the temple S21 is rotated about the joint S9 as it is opened, the stop S19 comes into bearing contact with a studlike extension of the frame around the lenses, so that as the temple S21 is rotated further, the closure sheath 5S firmly joined to the temple S21 compresses the compression spring S1, and the closure sheath S5 slides along the bar S7 of the temple part S11. If the temple S21 is then released, it is pivoted back again by the restoring force of the compression spring S1 until the inner end faces of the temple S21 enter into bearing contact with the temple part S11.

A spring hinge designed in this way has the disadvantage that multiple individual components must cooperate, and that assembling a temple equipped with this kind of spring hinge requires complicated individual steps. Replacing the spring is extremely complicated and can sometimes be done only with special tools. Moreover, the temple with the above-described spring hinge cannot be sandblasted after assembly without impairing the accessibility of the spring hinge. Moreover, to attain a high spring tension over only small opening angles, the entire spring hinge must be screwed together prestressed, which sometimes requires special equipment.

SUMMARY OF THE INVENTION

The object of the invention is therefore to further develop a spring hinge, especially for a temple of a pair of glasses, in such a way that the individual components of the spring hinge are simple to assemble and remove and so that each individual component can be handled separately.

According to the invention, the spring of a spring hinge assembly is moved toward the joint by a tension bar. To that end, the tension bar engages a first abutment and cooperates in such a way with a second abutment that is fixed to the joint so that beyond a predetermined opening angle of the spring hinge, the first abutment is moved toward the joint under spring tension or compression of the spring. With this arrangement of the spring hinge assembly according to the invention, each individual component of the spring hinge assembly can be mounted or removed and handled separately, simply and without a special tool. In addition, each individual component can also be embodied separately from a designer standpoint, which fundamentally offers more design options for the glasses frame. Because of the simple, elegant design, production costs are reduced to a minimum. Moreover, because of the design of the spring hinge assembly, it can be galvanized and sandblasted after being attached to the glasses frame, without impairing the accessibility to the spring hinge itself. The problems that arise when the glasses frame is matted or frosted in this way are also easily circumvented, and the matting of the glasses frame need not—as is usual in the prior art—be done beforehand, but rather can be done according to the invention in the assembled state as well. As a result of the design according to the invention, a great deal of design flexibility is possible, for instance with respect to the springs to be installed, the coloration, and the overall appearance.

Because the spring hinge assembly according to the invention works with two abutments—one of them being movable on the temple, and the other being fixed to the joint of the glasses frame—the stop faces that are otherwise necessary between the temple and the part of the temple that has the joint, or between the temple and the frame around the lenses, are eliminated. Moreover, via the spacing between the joint and the second abutment fixed to the joint, a kind of leverage can be attained, by way of which the functioning of the spring hinge can be adjusted.

The second abutment fixed to the joint may be embodied in the form of a recess that is engaged by a tension bar head. Such an abutment is furnished in a simple way that is produced at little technological effort or expense. The design options for the glasses frame can be expanded in such a way that the surface of the tension bar head, for instance, can be designed differently, or can be set with a diamond in especially high-priced frames. Depending on how the tension bar is embodied or on the property of the material of the tension bar, a through opening can be provided laterally of the joint along one leg of the opening angle. When the glasses are opened, the tension bar slides along the through opening, which opens out into the recess. With this through opening that extends essentially horizontally, it is assured, particularly in the case of rigid tension bars, that bending strain in the tension bar is reduced or avoided entirely.

In accordance with another embodiment in which the first abutment is in the form of a ring that can be slid on the temple, the ring and the spring are threaded onto the temple. Thus, the spring hinge assembly can be put together in a simple way and taken apart and assembled as needed. The spring can be replaced easily for the sake of wearing comfort or to adjust the spring action.

If the abutment of the tension bar engages the side of the spring toward the joint, then the spring can be designed in a simple way as a spiral spring. Conversely, if the abutment of the tension bar engages the end of the spring remote from the joint, then the spring action can be attained in a simple way by means of a compression spring.

Moreover, it is also conceivable that the spring is formed of an elastic plastic part, which is preferably in the form of an elastomer tube.

The design of the spring hinge assembly according to the invention also allows a snap action for the temple in which the spring is pressed against a stop element that is connected to the joint via a cam guide.

BRIEF DESCRIPTION OF THE DRAWINGS

Exemplary embodiments of the invention will be described in further detail below in terms of the following schematic drawings in which.

DESCRIPTION OF THE PREFERRED EMBODIMENTS

Figure 1:
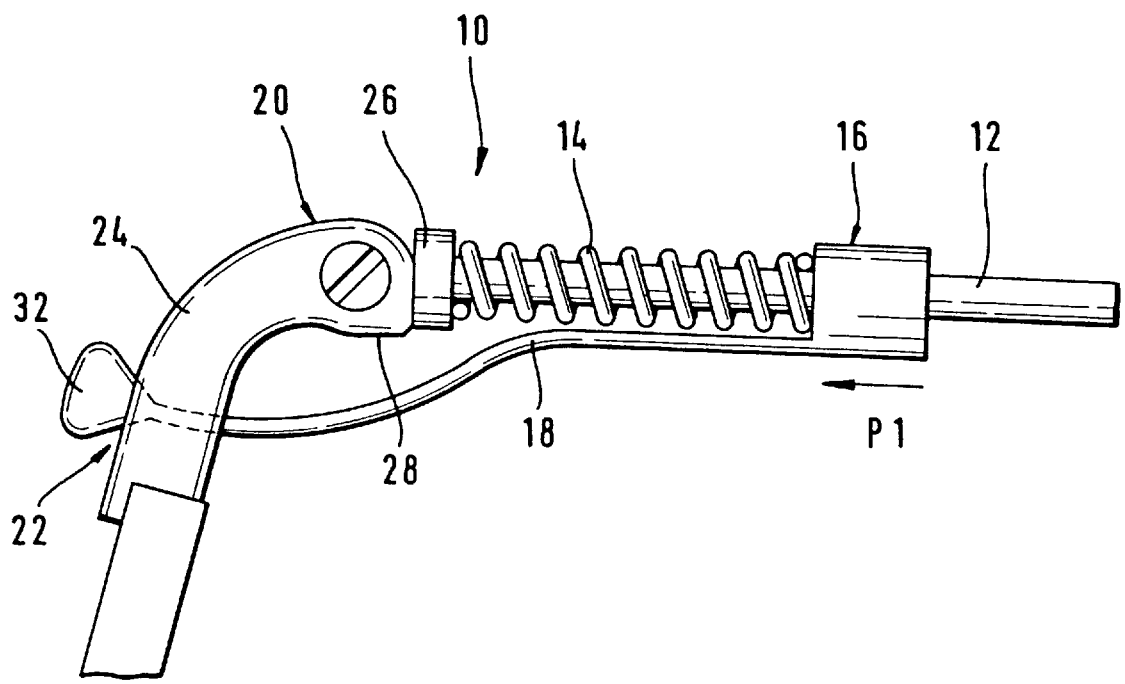
FIG. 1 is a plan view of a spring hinge according to the present invention mounted in a pair of glasses, with the glasses in the open state.

In FIG. 1, reference numeral 10 designates a spring hinge arrangement that is mounted on the temple 12. The spring hinge 10 has a spring 14, which is preferably threaded onto the temple 12; an abutment 16, which is engaged by a tension bar 18; a joint or hinge 20; and an abutment 22, fixed to the joint, that is intended for the tension bar 18. The abutment 22 is preferably disposed in the connecting strut 24 that joins the glasses frame to the joint 20. In order to furnish a snap action for the temple when the glasses are opened or closed, a further stop element 26 may, for instance, be provided on the end of the spring 14 opposite the abutment 16. Stop element 26 is guided on opening or closing via a cam 28, thereby tensing the spring by the amount of the cam stroke.

In the unfolded, open state of the temple 12, the abutment 16 has moved toward joint 20 (see arrow, P1) by action of the tension bar 18 engaging the abutment 22 fixed to the joint and pulling abutment 16, thereby compressing the spring 14. To limit the mobility of the abutment 16 in the relaxed state, or in other words the folded, closed state of the temple 12, it is conceivable to use a long temple cover which is slipped onto the temple 12, or to provide the temple 12 with a threaded hole into which a screw is turned so as to extend from the temple as a hard stop, in order to fix the longitudinal motion of the abutment.

Figure 2:
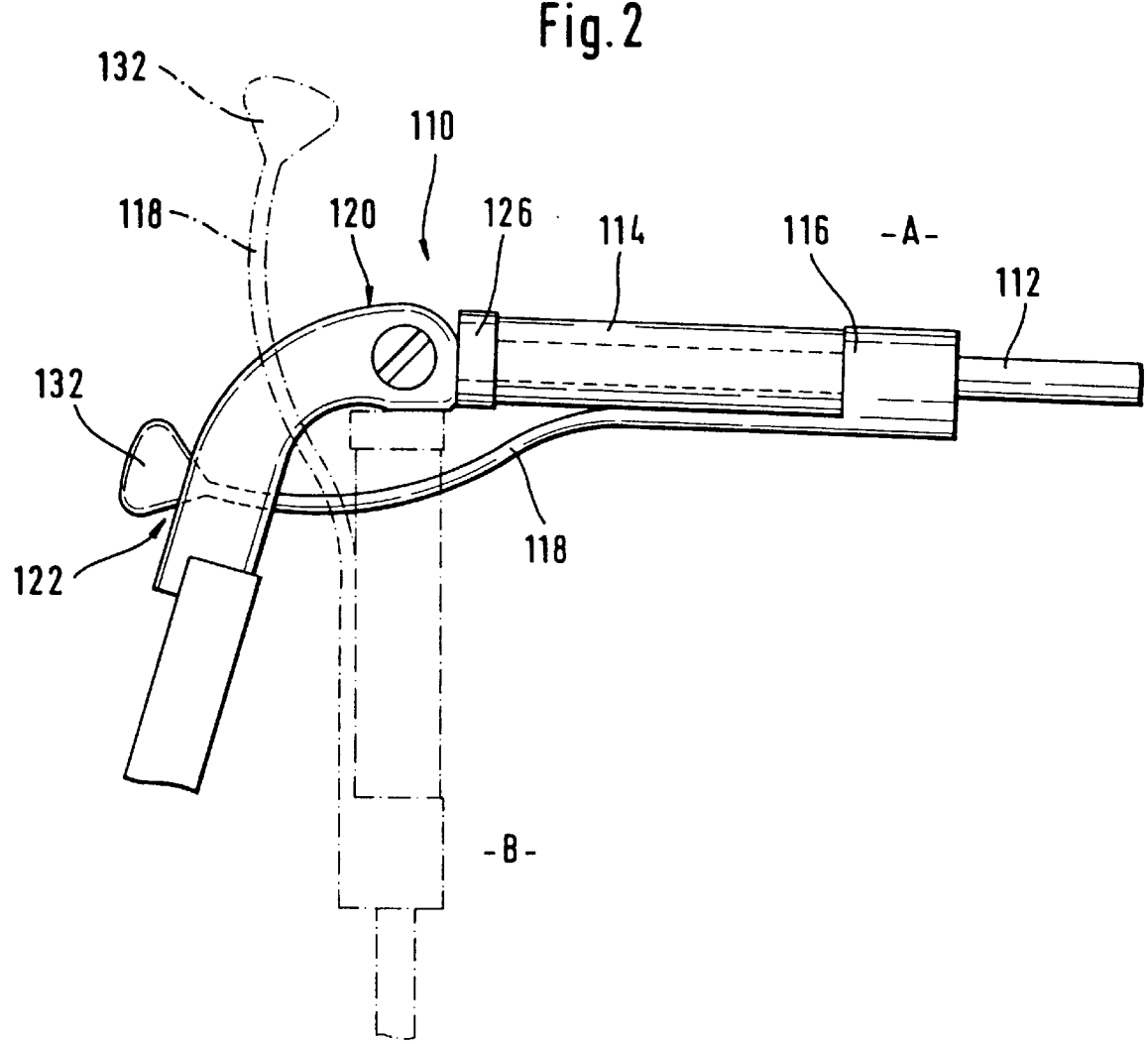
FIG. 2 is a further embodiment of the spring hinge, showing the temple both in the open state and in the folded, closed state.

FIG. 2 shows a further exemplary embodiment of the spring hinge according to the invention as shown in FIG. 1; here, instead of the spring, an elastic plastic part is used, for instance in the form of an elastomer tube 114. The temple is also shown in the open state A and closed state B in FIG. 2. The components of the exemplary embodiment of FIG. 2 correspond to the components of FIG. 1, the reference numerals merely being preceded by a 1 in the exemplary embodiment of FIG. 2.

Figure 3:
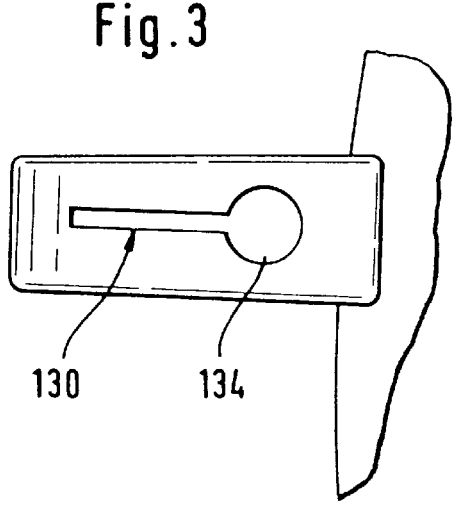
FIG. 3 is a front view of the connecting strut between the glasses frame and the joint.
Figure 4:
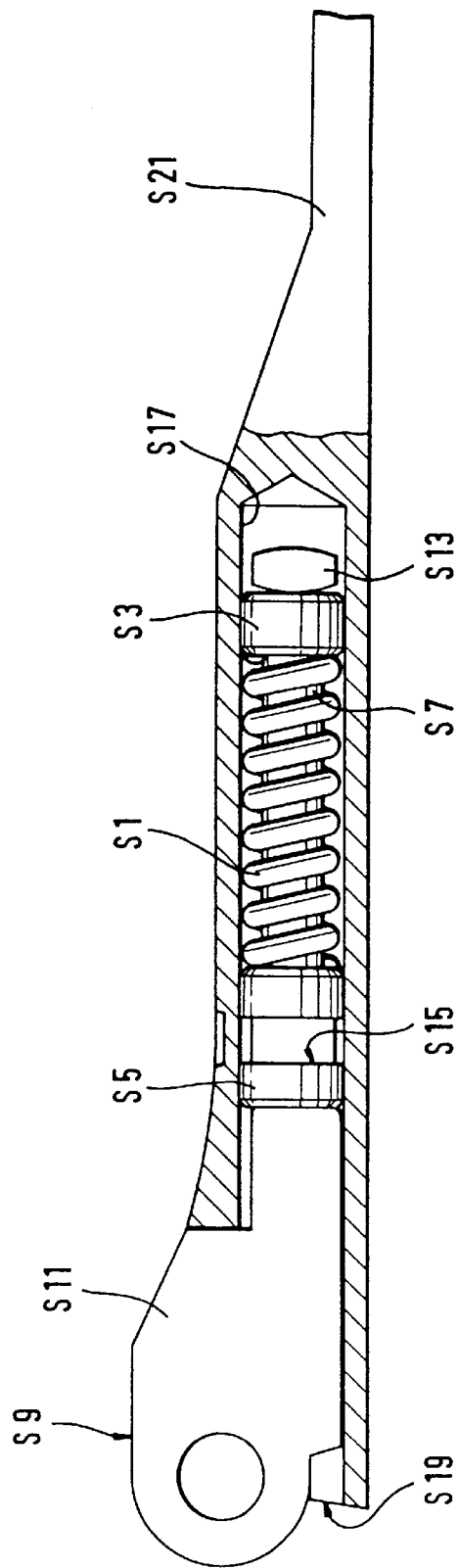
FIG. 4 is a plan view of an earpiece or temple with a prior art spring hinge.

As can be seen clearly from this illustration, the tension bar 118 in the closed state B protrudes laterally from the glasses and, during the opening of the temple 112, executes a lateral motion, which is enabled by the through opening 130 (see FIG. 3). The tension bar head 132 is pivoted into the hollow recess 134 provided for this purpose in accommodating this motion. The shape of the hollow recess 134 is adapted to the tension bar head, so that the tension bar head 132 and the hollow recess 134 together form the abutment 122 fixed to the joint.

With the design according to the invention of the spring hinge, it is now possible to set various angles of inclination without having to machine the joint arrangement afterward.

The disposition of the spring on the temple is not limited to being fixed merely in front of the joint. Moreover, the spring, preferably a compression spring, can also be sheathed with a tube or the like, and the tube can also be designed in various ways.

It is understood that modifications of the spring hinge are possible without departing from the fundamental concept of the invention. In particular, the tension bar may be formed by an essentially vertically oriented leaf spring.

I claim:

1. A spring hinge assembly adapted for use with a temple of a pair of eyeglasses, said spring hinge comprising:
    a first abutment movably disposed on the temple;
    a joint for pivotally mounting the temple to the eyeglasses;
    a second abutment disposed adjacent said joint;
    a resilient element operatively engaged with said first abutment and providing a yielding resistance to translation of said first abutment with respect to the temple; and
    a tensioning member attached to and extending from said first abutment member for engaging said second abutment as the temple approaches an opened position to cause said first abutment to translate relative to the temple toward said joint against the yielding resistance of the resilient element.

2. The spring hinge assembly of claim 1, wherein said resilient element is a spiral spring.

3. The spring hinge assembly of claim 1, wherein said resilient element is a compression spring.

4. The spring hinge assembly of claim 1, wherein said resilient element is formed of an elastic plastic part.

5. The spring hinge assembly of claim 4, wherein said elastic plastic part is in the form of an elastomer tube.

6. The spring hinge assembly of claim 1, wherein said second abutment is defined by an inner surface of a recess, and said tensioning member includes a tensioning member head, disposed adjacent an end of said tensioning member opposite said first abutment, which engages said inner surface when the temple approaches the opened position.

7. The spring hinge assembly of claim 1 or 6, wherein the first abutment and the resilient element are threaded onto the temple.

8. The spring hinge assembly of claim 1, wherein said tensioning member moves with the temple about said joint as the temple is moved between the opened position and a closed, folded position, said tensioning member moving within an opening formed in the eyeglasses when moving with the temple.

9. The spring hinge assembly of claim 1, further comprising:
    a stop element against which said resilient element is pressed; and
    a cam guide associated with said joint, said stop element engaging said cam guide to create a snap action in the motion of the temple as the temple approaches the opened position.

* * * * *